United States Patent [19]

Dagata et al.

[11] Patent Number: 5,117,439
[45] Date of Patent: May 26, 1992

[54] METHOD FOR OPERATING AN ELECTRODE GRAPHITIZATION FURNACE

[75] Inventors: Frank J. Dagata, Middleburg Heights; Kenneth G. Politowicz, Brunswick, both of Ohio

[73] Assignee: Ucar Carbon Technology Corporation, Danbury, Conn.

[21] Appl. No.: 677,109

[22] Filed: Mar. 29, 1991

[51] Int. Cl.⁵ .............................................. H05B 7/06
[52] U.S. Cl. ....................................... 373/88; 373/91; 373/93; 373/114; 62/216; 264/27; 428/408
[58] Field of Search ................ 373/88, 89, 90, 91, 373/92, 93, 114, 131; 62/64, 216; 264/27, 29.5; 428/408

[56] References Cited

U.S. PATENT DOCUMENTS

| | | | |
|---|---|---|---|
| 1,029,121 | 6/1912 | Heroult | 373/114 |
| 4,332,856 | 6/1982 | Hsu | 428/408 |
| 4,422,303 | 12/1983 | Rothenberg et al. | 62/216 |
| 4,594,772 | 6/1986 | Böder | 373/91 |
| 4,852,120 | 7/1989 | Udo | 373/95 |
| 4,942,002 | 7/1990 | Feist | 264/27 |
| 4,998,709 | 3/1991 | Griffin et al. | 264/29.5 |

*Primary Examiner*—Bruce A. Reynolds
*Assistant Examiner*—Tu Hoang
*Attorney, Agent, or Firm*—E. Lieberstein

[57] ABSTRACT

The electric furnace operating cycle time is substantially reduced by directing water into the porous pack of carbonaceous material surrounding the electrodes at a water rate adjusted to maximize vaporization of water into steam within the porous pack while allowing the steam to escape without contacting the electrodes.

10 Claims, 4 Drawing Sheets

METHOD FOR OPERATING AN ELECTRODE GRAPHITIZATION FURNACE

FIELD OF THE INVENTION

This invention relates to an improved method for operating an electric furnace in the manufacture of graphite electrodes.

BACKGROUND OF THE INVENTION

Graphite electrodes are used in the manufacture of steel. The graphite electrode is formed from a carbon electrode which is graphitized at temperatures exceeding 2800° C. in an electrode graphitization furnace. Because of the high temperature required to graphitize the electrode, an extremely long cool down time period is required before the furnace can be unloaded and reloaded with fresh stock. This limits process capacity. Over eighty percent (80%) of the furnace cycle time involves waiting for the electrodes to cool before unloading and waiting for the unloaded furnace bed to cool before reloading. Attempts to unload a hot furnace results in surface oxidation of the electrodes, thermal damage to furnace components, thermal damage to handling equipment, excessive oxidation of the insulating pack and an unsafe working environment. Reloading a furnace with a hot bed can also lead to worker injury and haphazard loading procedures. Construction of additional furnaces to increase capacity is inefficient and expensive. Accordingly, a method has long been sought to reduce the cool down time period for the electrodes after they have been graphitized and/or to reduce the cool down time period of the furnace bed for reloading the furnace.

SUMMARY OF THE INVENTION

It has been discovered in accordance with the present invention that the furnace cool down time period and the recycle time for reloading the furnace with fresh carbon electrodes can be substantially reduced by spraying water over the insulating pack of granulated coke particles surrounding the electrodes, in a controlled manner, as will be explained at length hereinafter, for cooling the furnace without causing contact between the cooling water and the electrodes. The rate of cooling water applied to the insulating pack is controlled so that the cooling water is converted to water vapor with essentially no water or water vapor coming into contact with the electrodes. If water, or water vapor above a nominal amount, should come into contact with a carbon electrode at the temperature of graphitization a reaction may occur generating explosive gases or at minimum the electrode will burn and be damaged. Accordingly, heretofore, water has never been considered a viable option for furnace cooling.

The method for operating an electric furnace in accordance with the present invention comprises:

loading ungraphitized carbon electrodes upon a bed of carbonaceous material into said furnace;

surrounding said carbon electrodes with presized granular particles of carbonaceous material to form a porous pack of thermal insulation;

passing electric current through or around said carbon electrodes to elevate the temperature of said electrodes to a temperature above 2800° C. for converting carbon to graphite;

terminating said current flow;

directing water into said porous pack of carbonaceous material with the rate of water adjusted to maximize vaporization of water into steam while allowing a sufficient amount of water to percolate through said porous pack to a controlled depth to form a cool blanket of packing material over said electrodes with essentially no water or water vapor coming into contact with the electrodes; and removing the graphitized electrodes from the furnace.

BRIEF DESCRIPTION OF THE DRAWINGS

Other advantages of the invention will become apparent from the following detailed description of the invention when read in conjunction with the accompanying drawings of which.

DETAILED DESCRIPTION OF THE PREFERRED EMBODIMENT

Figure 1:
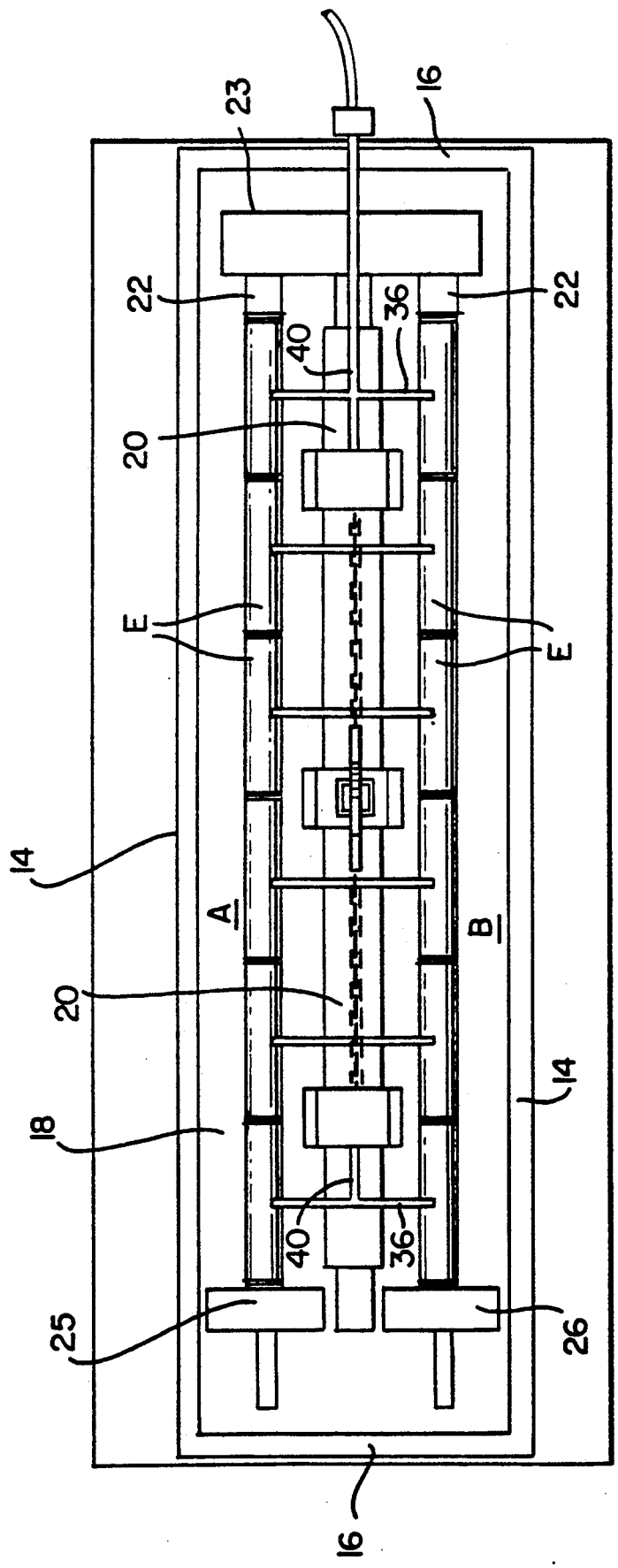
FIG. 1 is a diagrammatic plan view of an electric furnace for converting carbon electrodes to graphite electrodes and includes one embodiment of a water spray assembly for practicing the method of the present invention.
Figure 2:
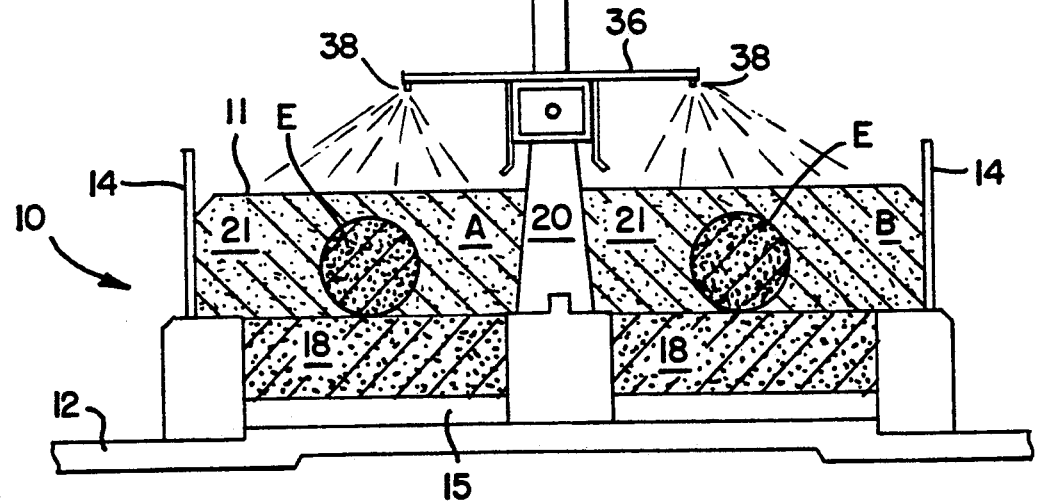
FIG. 2 is a cross sectional view taken along the lines 2—2 of FIG. 1.

Carbon electrodes are converted to graphite electrodes in an electric furnace by raising the temperature of the electrodes to a temperature exceeding 2800° C. The arrangement of the electrodes for a typical graphitization furnace is shown in FIG. 1-2 in conjunction with a water spray assembly for practicing the method of the present invention. The electric furnace 10 is constructed in the form of a rectangular enclosure having an open top 11, a concrete floor or base support 12, side walls 14 and end walls 16. Refractory blocks 15, e.g. of fire brick are mounted over the concrete floor 12. A bed 18 of a carbonaceous refractory packing material e.g. of coke, is placed over the refractory blocks 15 to form a uniform conductive refractory body upon which to rest the electrodes E. A center wall 20 divides the furnace 10 into two sections A and B respectively, each of which contains a multiple number of electrodes E arranged in parallel rows. A pack 21 of granular carbonaceous material preferably of coke, surrounds the electrodes E. The granular material forming the pack 21 is presized to form a porous refractory thermal insulating body which permits volatiles to pass through the pack 21 during the firing cycle and to escape through the open top 11 of the furnace 10.

The electrodes E are arranged in line formation in parallel rows with the electrodes aligned end to end within each section A and B of the furnace 10. The row of electrodes E in section A are bridged at one end of the furnace 10 to the row of electrodes E in section B through spacers 22 and a graphite cross-over member 23 to form a series circuit between the electrodes E of section A and the electrodes E of section B. Terminal posts 25 and 26 connect the electrodes E at the opposite end of the furnace 10 through electrical contacts (not shown) to a power supply (not shown) for directing electric current through the electrodes E to graphitize the carbon electrodes E at an elevated temperature of above 2800° C. as is well known to those skilled in the art. The graphitizing operation is generally fully completed in about 40 hours. Upon completion of the graphitizing cycle electrical power is shut off and the cooling cycle is initiated. The cooling cycle covers a cool down time period to reduce the electrode temperature to a temperature which permits removal of the electrodes from the furnace and a cooling period to reduce the temperature of the refractory bed 18 to a temperature which permits reloading the furnace with new carbon electrodes. The combined cooling time represents the complete cooling cycle which is generally from four to six times as long as the furnace firing time.

Figure 3:
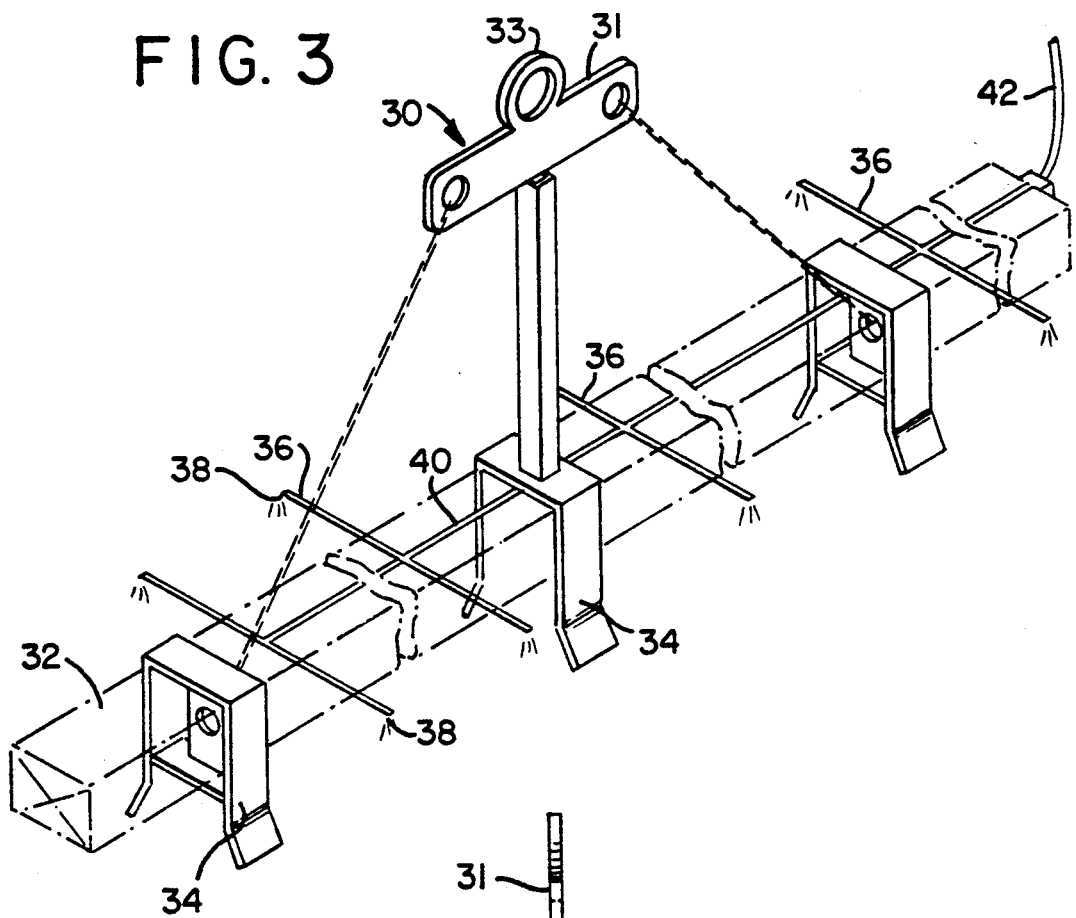
FIG. 3 is a perspective view of the water spray assembly of FIG. 1.

The furnace 10 is cooled in accordance with the present invention using a cooling system as is exemplified in FIGS. 1 and 3 inclusive. In FIG. 3 a removable frame 30 is shown which includes an angle lift 31 with an eye hook 33 adapted to be lifted by a crane (not shown) for positioning the frame 30 over the center wall 20 of the furnace 10. The frame 30 includes a box-like girder 32 with reinforced open web joints 34 spaced apart along the length of the girder 32 which rest on the center wall 20. A multiple number of cross pipes 36 are fixedly secured to the girder 32 for supplying water to water spray nozzles 38 attached to the opposite ends of the cross pipes 36. A water supply feed line 40 extends along the girder 32 longitudinally and intersects each of the cross pipes 36 to form a common supply line for each of the nozzles 38 via the cross pipes 36. The water supply feed line 40 is coupled through a quick disconnect (not shown) to a hose 42 which is connected to a pressure regulated water supply (not shown).

At least one water spray nozzle 38 extends from each cross pipe 36 over each section A and B respectively. The cross pipes 36 are spaced relatively evenly apart over the length of the girder 32 which corresponds to the length of the furnace 10 and may be 70 or more feet long. The spacing between cross pipes 36 is calculated to establish a uniform distribution of water over the porous pack 21.

Figure 4:
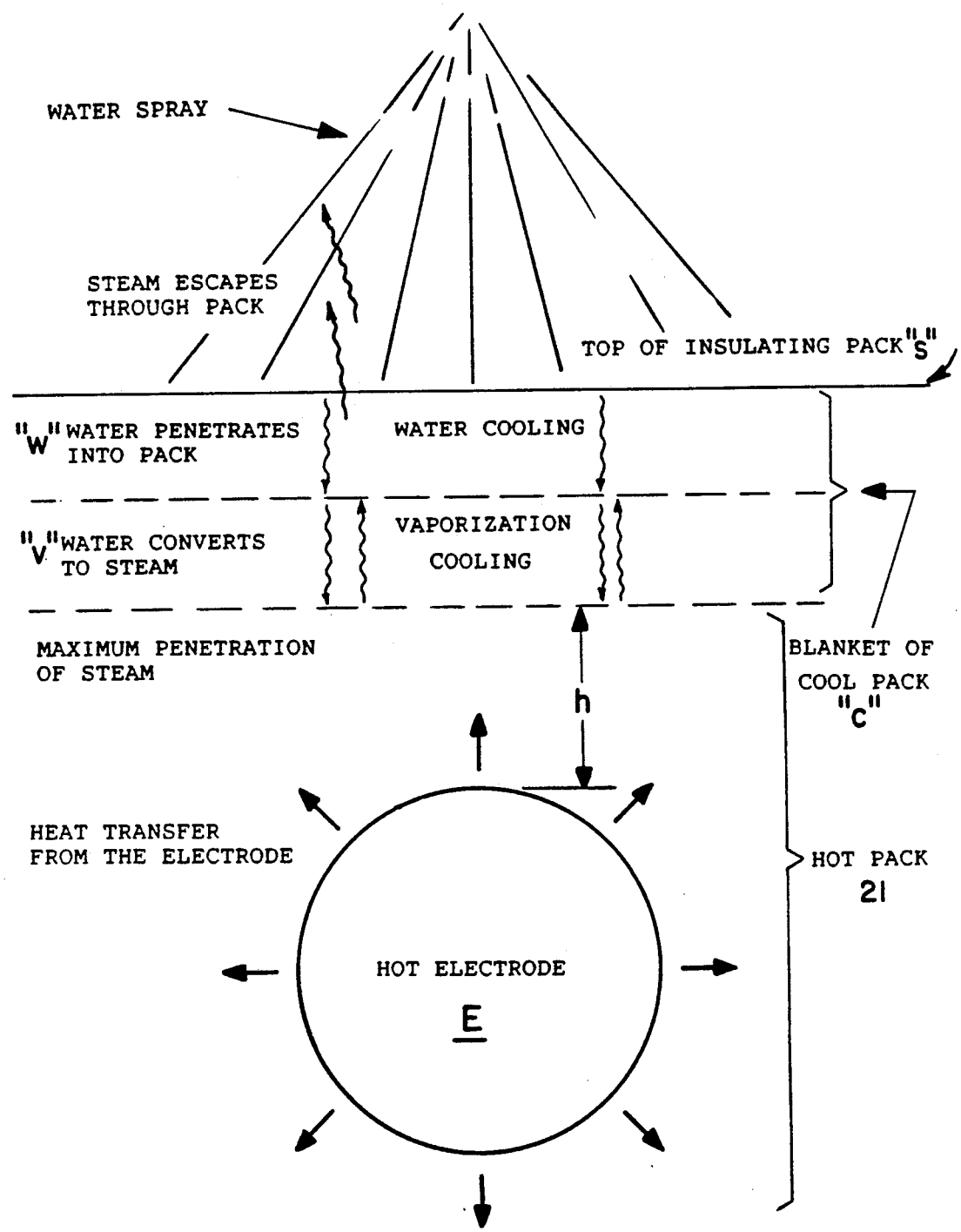
FIG. 4 is a graphic illustration of the water cooling heat transfer relationship in the insulating pack during the furnace operation.

The water emitted from the nozzles 38 is sprayed into the pack 21 at a flow rate which is preferably uniform and balanced. The water percolating through the pack 21 should not come into contact with the electrodes E. Accordingly, the rate at which the water is applied is critical and is dependent upon the permeability of the insulating pack 21. To achieve maximum cooling of the pack 21 it is essential that enough water passes below the surface of the pack 21 to form a cool blanket C of packing material before complete vaporization occurs i.e. the submerged water should vaporize above the electrodes E and escape through the cool blanket C of packing material. This is apparent from FIG. 4 which is a graphic illustration of the water cooling heat transfer relationship in the pack 21. The cool blanket C of packing material extends from the top surface S and is composed of an area W saturated with water and a contiguous area V of vaporized water which lies above the electrodes E. Vaporized cooling within the pack 21 is as much as ten times more efficient than liquid water cooling. The water vapor escapes through the blanket C to prevent any contact with the electrodes E so as to avoid burning the electrodes. In theory you want to spray a sufficient amount of water to form a water saturated area W of limited depth with an adjacent area V of vaporized water spaced from the electrodes E. Although the majority of the water will initially vaporize upon contact with the top surface S of the hot pack 21 the amount of applied water must be sufficient for enough excess water to percolate through the pack 21 to form a blanket C of cool packing material containing a water saturated area W. The conversion from water to steam provides very efficient cooling of the underlying hot insulating pack 21 surrounding the electrodes E. As the cool water percolates through the pack 21, it is, in effect, reducing the thickness of the hot pack 21 to speed cooling. The cool blanket C of packing material lies above the underlying hot pack 21 and removes the heat from the hot pack 21 faster than natural or forced air convection can.

As stated above, the rate at which the water is applied depends on the permeability of the insulating pack 21. Accordingly, each pack 21 will require a different water application rate. For example, various furnaces have been water spray cooled with a water application rate of between 4–25 gallons per minute. Total application of water has also varied from between 6000–16,000 gallons depending on the furnace temperature, pack permeability and desired cooling rate.

After unloading the graphitized electrodes E, additional cooling is required to cool the underlying bed 18 before the furnace 10 can be reloaded with ungraphitized carbon electrodes. This may involve a time period of up to 120 hours. The bed 18 must be restored to a safe loading temperature to avoid worker injury and haphazard loading procedures. In accordance with the present invention, cooling of the bed 18 after the graphitized electrodes are removed may be accelerated by applying water to the bed at a rate to maximize cooling of the bed 18 but limited the bed 18 is converted to steam by vaporization prior to reloading fresh electrodes E. Preferably, water should be applied to cool the bed 18 at a rate of between 4 to 25 gallons per minute using 150–3000 gallons total.

Figure 5:
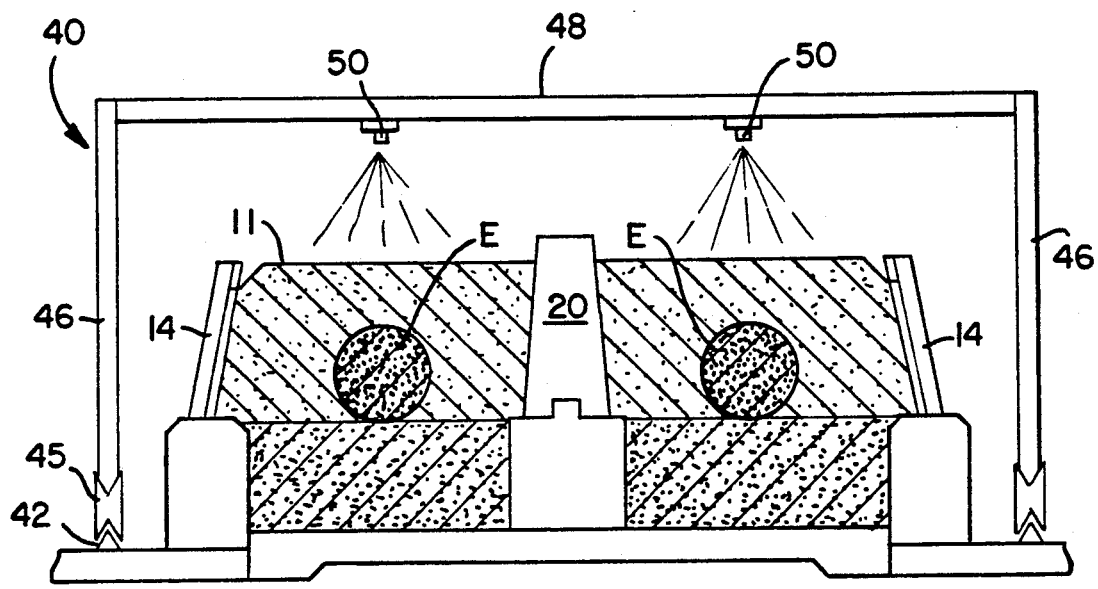
FIG. 5 is a cross sectional view of the furnace of FIG. 1 with an alternate water spray cooling assembly.

The water spray pattern is not critical to the present invention. In FIG. 2 water is sprayed from a cooling system in which the removable frame 30 is supported by the center wall 20. In this arrangement the frame 30 may be lifted and transported to another furnace. An alternate removable assembly for spraying cooling water on the pack 21 is shown in FIG. 5. A removable frame 40 is supported over guide rails 42 using V rollers 45 which are removably mounted over the guide rails 42 on opposite sides of the furnace side walls 14. The V-rollers 45 are connected to the upright supports 46 of the frame 40. The upright supports 46 are connected to an overhead support 48 located above the open top end 11 of the furnace 10. A plurality of water spray nozzles 50 are connected through piping (not shown) in the overhead support 48 for supplying water to the nozzles 50. The frame 40 has a multiple number of overhead supports 48 spaced uniformly along the length of the furnace with at least one water spray nozzle 50 suspended from an overhead support 48 over each section A and B respectively.

Figure 6:
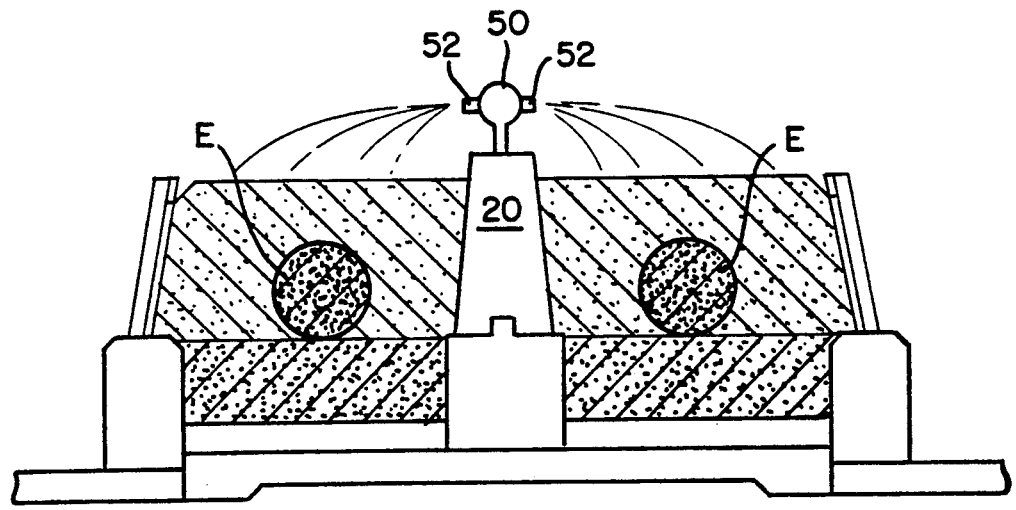
FIG. 6 is a view similar to FIG. 5 with yet another water spray assembly for providing a different water spray pattern.

Another assembly for spraying cooling water on the pack 21 is shown in FIG. 6. In this arrangement the spray nozzles 52 are connected through a common manifold 54 which is connected to piping (not shown) extending through the center wall 20 for supplying water to the spray nozzles 52. The water is sprayed outwardly in a horizontal trajectory from the center wall 20. The pattern of water spray from the nozzles 52 is inherently different from the overhead spray arrangement of FIGS. 2 and 5. Alternately, the nozzles 52 may be connected to spray the water in a vertical trajectory with an umbrella-like spray. The pattern of water spray may also be varied so that the water is applied as water droplets rather than as a spray.

What we claim is:

1. A method for operating an electric furnace in the conversion of carbon electrodes to graphite electrodes comprising the steps of:

loading ungraphitized carbon electrodes upon a bed of carbonaceous material, into said furnace;

surrounding said carbon electrodes with presized granulated particles of carbonaceous material to form a porous pack of thermal insulation;

passing electric current through or around said carbon electrodes to elevate the temperature of said electrodes to a temperature above 2800° C. for converting the carbon electrodes into graphitized electrodes;

terminating said current flow;

directing water into said porous pack of carbonaceous material to form a cool blanket of packing material over said electrodes with the rate of water adjusted to percolate through said porous pack to a controlled depth represented by an area saturated with water and an area of vaporized water with the vaporization of water into steam occurring at a rate such that essentially no water or water vapor comes into contact with the electrodes; and removing the graphitized electrodes from the furnace.

2. A method as defined in claim 1 wherein said ungraphitized carbon electrodes are loaded into said furnace with the electrodes aligned end to end in an electrical series circuit relationship.

3. A method as defined in claim 2 wherein said furnace has a common center wall and wherein at least one row of electrodes is aligned on opposite sides of said center wall and connected through a common crossover member.

4. A method as defined in claim 4 wherein said rate of water applied to said porous pack is between 4 and 25 gallons per minute.

5. A method as defined in claim 5 wherein said cooling water is applied to said porous pack through a plurality of uniformly distributed water nozzles suspended above said porous pack.

6. A method as defined in claim 4 wherein said water is applied to said porous pack through a plurality of uniformly distributed water nozzles extending from a common manifold supported by said common center wall.

7. A method as defined in claim 5 wherein said water is applied in the form of a spray.

8. A method as defined in claim 5 wherein said water is applied in the form of water droplets.

9. A method as defined in claim 1 further comprising applying water to said bed of carbonaceous material after the graphitizing electrodes are removed.

10. A method as defined in claim 9 wherein said water is applied at a rate of between 4 to 25 gallons per minute.

* * * * *